US012607044B2

(12) United States Patent
Hexiao et al.

(10) Patent No.: US 12,607,044 B2
(45) Date of Patent: Apr. 21, 2026

(54) ALARM TAG WITH COMBINATION ACCESS

(71) Applicant: Control Group Companies, LLC, Bridgewater, NJ (US)

(72) Inventors: Wang Hexiao, Xiaoshan (CN); Brian Mark Diplock, Far Hills, NJ (US); Thomas John Meehan, Woodcliff Lake, NJ (US)

(73) Assignee: Control Group Companies, LLC, Bridgewater, NJ (US)

( * ) Notice: Subject to any disclaimer, the term of this patent is extended or adjusted under 35 U.S.C. 154(b) by 122 days.

(21) Appl. No.: 18/411,269

(22) Filed: Jan. 12, 2024

(65) Prior Publication Data

US 2025/0230688 A1 Jul. 17, 2025

(51) Int. Cl.

| | |
|---|---|
| ***E05B 73/00*** | (2006.01) |
| ***E05B 37/02*** | (2006.01) |
| ***E05B 45/00*** | (2006.01) |
| *E05B 67/22* | (2006.01) |

(52) U.S. Cl.

CPC ........ *E05B 73/0017* (2013.01); *E05B 37/025* (2013.01); *E05B 45/005* (2013.01); *E05B 67/22* (2013.01)

(58) Field of Classification Search

CPC .... E05B 73/00; E05B 73/0017; E05B 37/025; E05B 45/005; E05B 67/22; E05B 37/02; E05B 37/10; E05B 37/14; Y10T 70/424; Y10T 70/415; Y10T 70/417; Y10T 70/5004; Y10T 70/7141; Y10T 70/7147

USPC .............................................................. 70/25

See application file for complete search history.

(56) References Cited

U.S. PATENT DOCUMENTS

| | | | | |
|---|---|---|---|---|
| 3,781,861 A | | 12/1973 | Adler et al. | |
| 4,556,872 A | | 12/1985 | Masoncup et al. | |
| 4,811,578 A | | 3/1989 | Masoncup et al. | |
| 5,404,735 A | | 4/1995 | Hsieh | |
| 5,587,702 A | | 12/1996 | Chadfield | |
| 5,727,405 A | | 3/1998 | Cromwell | |
| 5,786,759 A | * | 7/1998 | Ling | E05B 67/006 70/DIG. 49 |
| 7,236,085 B1 | | 6/2007 | Aronson et al. | |
| 9,115,511 B1 | | 8/2015 | Schmidt et al. | |

(Continued)

FOREIGN PATENT DOCUMENTS

| | | |
|---|---|---|
| EP | 0413065 A1 | 2/1991 |
| EP | 3786397 A1 | 6/2022 |
| WO | 9505515 A1 | 2/1995 |

*Primary Examiner* — Suzanne L Barrett
(74) *Attorney, Agent, or Firm* — Luedeka Neely, P.C.

(57) ABSTRACT

An alarm tag having a housing, a shackle and an electronic circuit within the housing having a lock alarm, the shackle being lockable to the housing to provide a locked condition of the alarm tag. The lock alarm includes combination locking structure that enables the alarm tag to be unlocked without the use of a separate key or detachment device. The lock alarm is activated if the housing is broken or the shackle is cut when the alarm tag is in the locked condition. The alarm tag also cooperates with conventional EAS antennas having an EAS alarm. If the alarm tag comes within a predetermined distance of the EAS antenna, the EAS alarm is activated. The alarm tag can also be configured to activate the lock alarm also if the alarm tag comes within a predetermined distance of the EAS antenna.

7 Claims, 17 Drawing Sheets

(56) References Cited

U.S. PATENT DOCUMENTS

| | | | |
|---|---|---|---|
| 9,196,136 B2 | 11/2015 | King | |
| 9,260,885 B2 | 2/2016 | Asquith et al. | |
| 10,089,811 B2 | 10/2018 | Ufkes et al. | |
| 10,385,591 B2 * | 8/2019 | Yang .................. | G08B 13/2434 |
| 10,458,153 B2 | 10/2019 | Nguyen et al. | |
| 10,851,562 B2 | 12/2020 | Park | |
| 11,149,471 B2 | 10/2021 | Nguyen et al. | |

* cited by examiner

ALARM TAG WITH COMBINATION ACCESS

FIELD

This disclosure relates to Electronic Article Surveillance (EAS) devices. More particularly, this disclosure relates to an EAS device having combination access and of improved structure that provides enhanced functionality beyond that of conventional EAS devices and with an aesthetically pleasing appearance.

BACKGROUND

Improvement is desired in electronic article surveillance (EAS) devices used to control inventory and to prevent or deter theft. EAS devices typically take the form as tags that are applied to an article to deter theft of the article in a retail store. One example of such tags is the multi-attach reusable tag described in U.S. Pat. No. 8,547,228.

Conventional EAS tags cooperate with an EAS antenna having alarm features. If the EAS tag comes into a preset distance of the EAS antenna, a signal is generated by the EAS antenna to trigger alarm features, typically an audible alarm like a buzzer and/or visual indicators such as lights. A conventional EAS tag has no alarm features itself and is operative only to trigger alarm features of an EAS antenna by proximity thereto.

Conventional EAS tags typically require a separate key or detachment device to remove the EAS tag from the article. This is inconvenient and complicates both the manufacture and use of the EAS devices. Furthermore, such devices if not installed on an article such as to be activated can easily be removed from a location and studied to determine how to deactivate such devices.

Conventional EAS devices also desire aesthetic improvement.

The present disclosure advantageously improves over previous attempts to provide EAS devices of improved utility and appearance, and provides an alarm tag having a housing, a shackle and an electronic circuit within the housing having a lock alarm, the shackle being lockable to the housing to provide a locked condition of the alarm tag. The lock alarm includes combination locking structure that enables the alarm tag to be unlocked without the use of a separate key or detachment device.

The lock alarm is activated if the housing is broken or the shackle is cut when the alarm tag is in the locked condition. The alarm tag also cooperates with conventional electronic antennas such as EAS antennas having an EAS alarm. If the alarm tag comes within a predetermined distance of the EAS antenna, the EAS alarm is activated. The alarm tag can also be configured to activate the lock alarm also if the alarm tag comes within a predetermined distance of the EAS antenna.

SUMMARY

The above and other needs are met by electronic article surveillance devices and systems and methods utilizing alarm tags according to the disclosure configured to function to activate alarms to both alert if the alarm tag is breached and if the alarm tag is moved proximate an electronic antenna.

In one aspect, alarm systems according to the disclosure include an electronic antenna having an electronic alarm; and an alarm tag combination lock that is securable in a locked condition to an article to be protected and removable from the article to an unlocked condition without use of a separate key or detachment device.

The alarm tag includes a housing containing an electronic circuit having a lock alarm and operable to activate the electronic alarm of the electronic antenna when located within a predetermined distance proximate the electronic antenna, a shackle configured to lock into the housing, and a plurality of rotatable gears and a plurality of digit wheels corresponding in number to the plurality of rotatable gears.

Each of the digit wheels surrounds and is coupled to one of the rotatable gears and bearing combination indicia or indicium so that rotation of the digit wheels causes rotation of the rotatable gears and the digit wheels are positionable to orient the combination indicia or indicium of the digit wheels to a desired combination for providing the unlocked condition for the alarm tag combination lock with the alarm tag combination lock being in the locked condition when the digit wheels are otherwise oriented.

The alarm tag combination lock is operable by rotation of the digit wheels to secure the shackle in the locked condition to the housing and to release the shackle from the locked condition to the housing to provide the unlocked condition.

The lock alarm is activated if the housing is broken or the shackle is cut when the alarm tag combination lock is in the locked condition, and the electronic alarm is activated if the alarm tag combination lock comes within the predetermined distance proximate the electronic antenna.

Another aspect of the disclosure is a security method. The security method includes providing an alarm tag having a housing and a shackle and an electronic circuit within the housing having a first alarm. The shackle is lockable to the housing to provide a locked condition of the alarm tag. The first alarm is activated if the housing is broken or the shackle is cut when the alarm tag is in the locked condition.

The method also includes the provision of an electronic antenna having a second alarm and a proximity sensor for sensing the electronic circuit of the alarm tag if the alarm tag comes within a predetermined distance of the electronic antenna, The second alarm is activated if the alarm tag comes within the predetermined distance of the electronic antenna.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIGS. 7A-7C depict use and operation of the alarm tag in a store setting when the alarm tag is not applied to an article or case or the like.

DETAILED DESCRIPTION

Figure 1B:
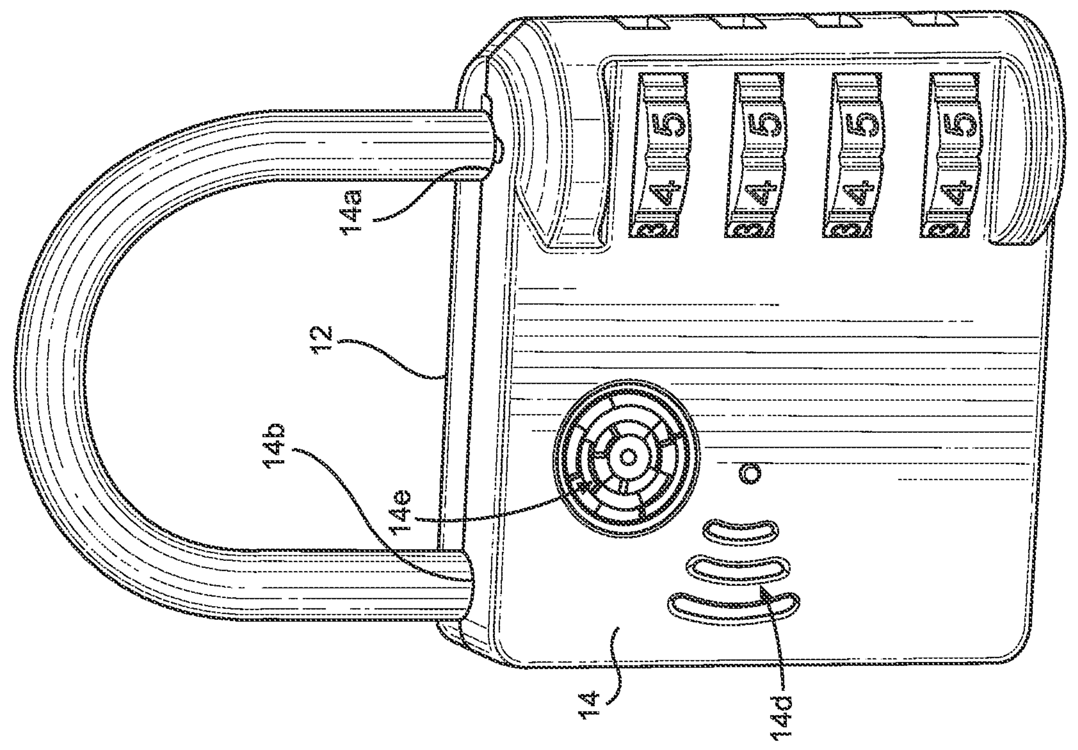
FIG. 1B is a rear perspective view thereof.
Figure 1A:
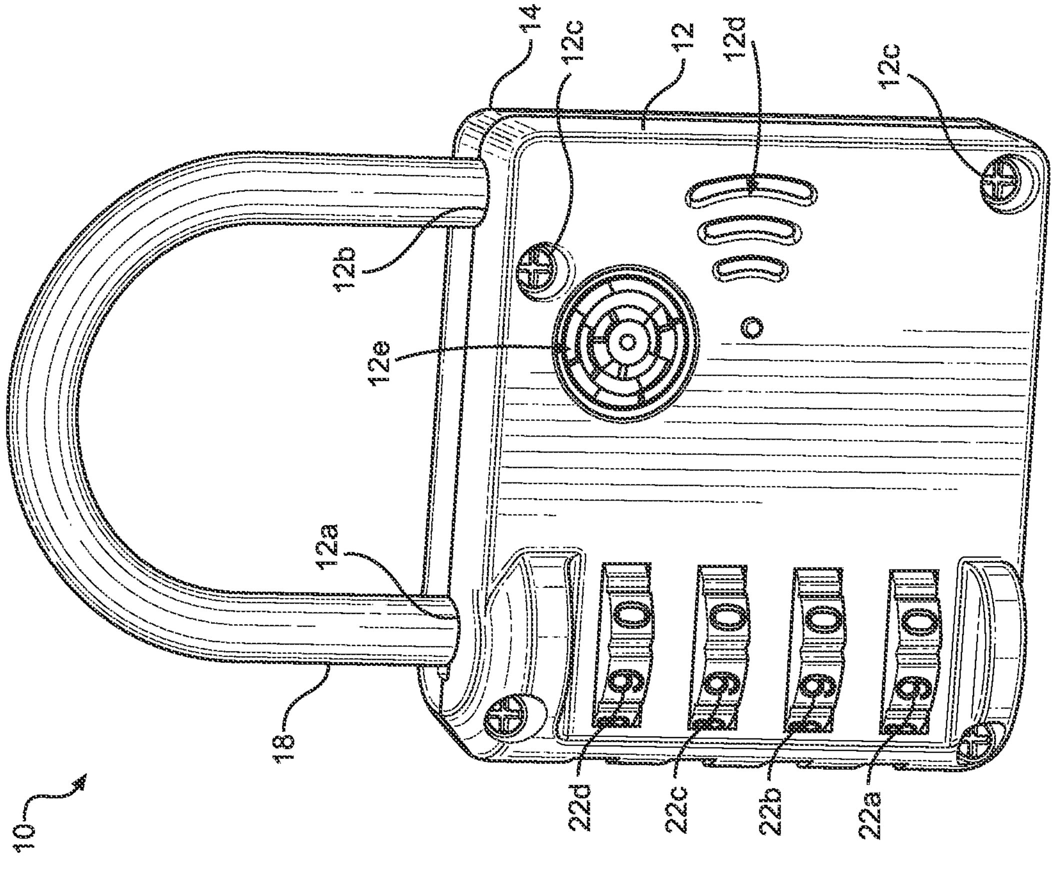
FIG. 1A is a front perspective view of an alarm tag according to the disclosure.
Figure 1D:
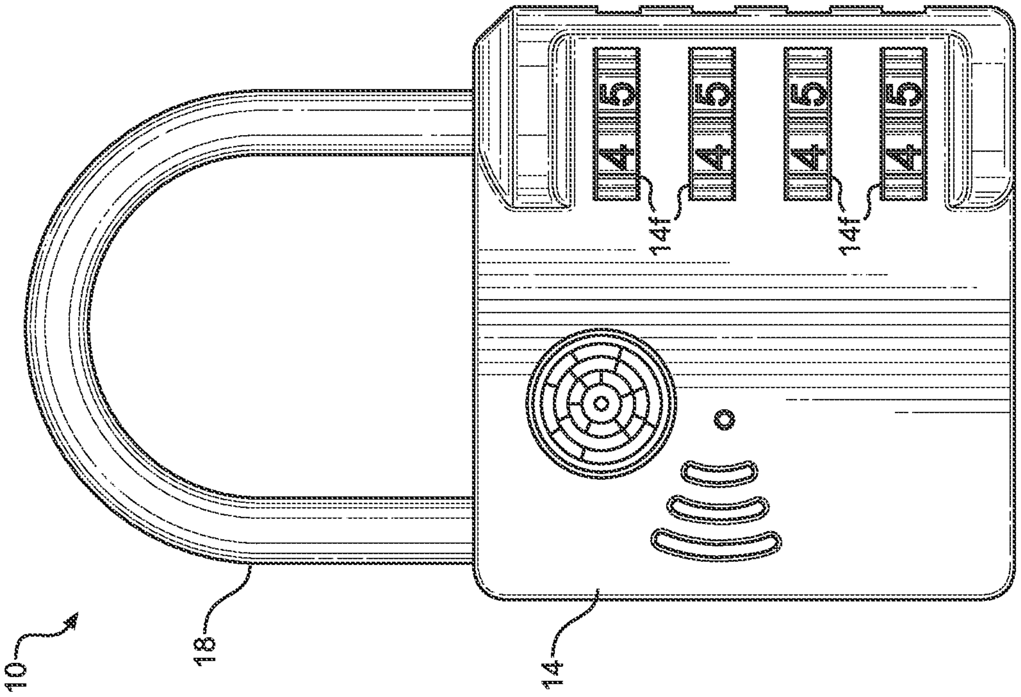
FIG. 1D is a rear view thereof.
Figure 1C:
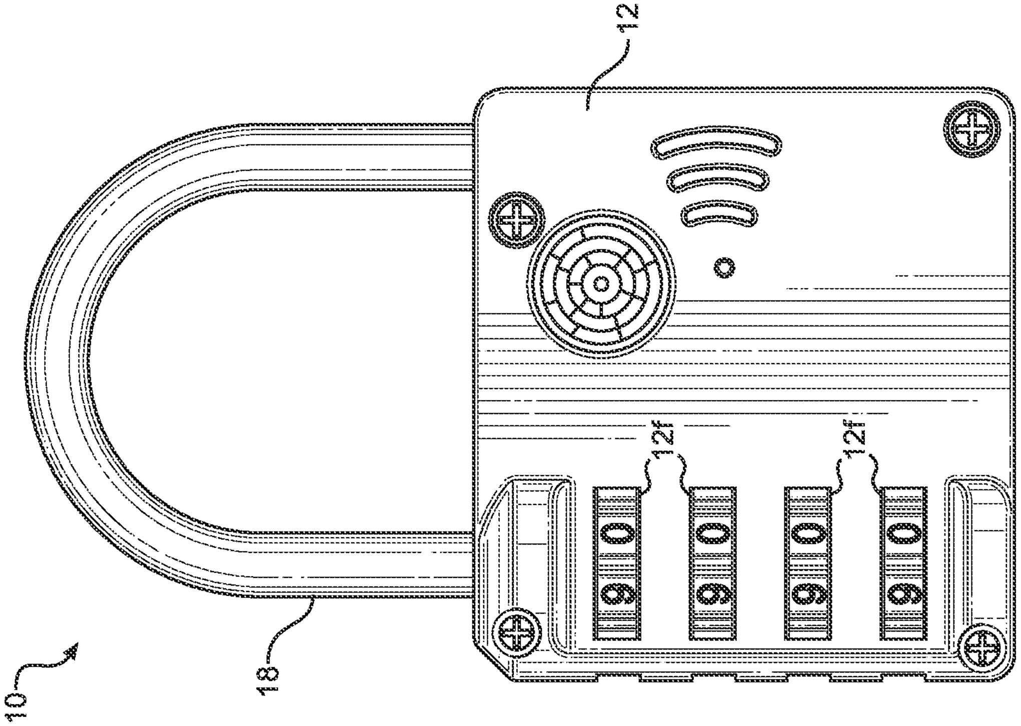
FIG. 1C is a front view thereof.

With reference to the drawings, there is shown an electronic article surveillance device configured as alarm tag 10 according to the disclosure. The alarm tag 10 is particularly configured for use in a retail store location to prevent or deter tampering and theft of articles to which the alarm tag 10 is applied as well as tampering and theft of the alarm tag 10 itself. As configured, the alarm tag 10 is accessible via a programmable combination locking mechanism as described herein which is one novel feature of the alarm tag 10.

The alarm tag 10 described herein is configured to have an anti-tamper alarm and to also cooperate with a conventional EAS antenna having an alarm. Thus, if the alarm tag 10 or articles it is applied to are tampered with, the anti-tamper alarm of the alarm tag 10 will be triggered.

If the alarm tag 10 comes within a predetermined distance of an EAS antennae, such as being carried past the EAS antenna A, the alarm of the EAS antennae will be triggered. Also, if desired, the alarm tag 10 can be configured to also alarm when in proximity to an EAS antenna. This is another novel feature of the alarm tag 10.

The appearance of the alarm tag 10 is also configured to be aesthetically pleasing and includes various ornamental aspects and features.

With initial reference to FIGS. 1A-1E and 2A-2D, the alarm tag 10 includes a front housing 12 attachable to a rear housing 14 as by screws 16. The housings 12 and 14 are desirably of molded plastic construction. The terms front and rear are relative to the views shown, as, the alarm tag 10 may be presented with either side facing outward to the viewer.

The front housing 12 includes semi-circular shackle openings 12*a* and 12*b*, circular screw apertures 12*c*, speaker openings 12*d*, illumination openings 12*e*, and front digit wheel slots 12*f*. A notch 12*aa* is provided adjacent to the shackle opening 12*a*.

The rear housing 14 includes semi-circular shackle openings 14*a* and 14*b*, interior screw receivers 14*c*, speaker openings 14*d*, illumination openings 14*e*, rear digit wheel slots 14*f*, and side digit wheel slots 14*g*. A notch 14*aa* is provided adjacent the shackle opening 14*a* and located to abut the notch 12*aa* when the housings 12 and 14 are assembled to provide an opening provided by both the notches 12*aa* and 14*aa*.

A hook-shaped shackle 18 is located to have a long-end 18*a* rotatably positioned within the housings 12 and 14, with a short-end 18*b* removably positionable from within the housings 12 and 14 to provide locking and unlocking of the alarm tag 10. The long-end 18*a* includes uniformly spaced-apart and aligned protrusions 18*aa* along an outer-facing edge thereof. The short-end 18*b* terminates in as a reduced diameter end 18*bb*. The shackle 18 is desirably of metal.

Rotatable gears 20*a*, 20*b*, 20*c*, and 20*d* are located within the housings 12 and 14 in a stacked configuration for receiving the long end 18*a* of the shackle 18. As seen in FIGS. 2C and 21D, the rotatable gears 20*a*-20*d* each include a plurality of uniformly spaced-apart and aligned raised drive surfaces 21 around the exterior circumferences thereof.

The gears 20*a*-20*d* also each include a switch extension 21*a* below the plane of the drive surfaces 21 and a reference extension 21*b* above the plane of the drive surfaces 21, whose functions are described below. The location of the switch extension 21*a* and the reference extension 21*b* are the same on each of the gears 20*a*-20*d*. The gears 20*a*-20*d* are desirably made of metal and engage the raised drive surfaces 21. The switch extension 21*a* and the reference extension 21*b* are not engaged by the gears 20*a*-2*d* and extend past the gears 20*a*-20*d*.

The rotatable gears 20*a*-20*d* each include an interior sleeve 23 configured to include a passage 23*a* configured as a vertical slot to receive and enable passage of the protrusions 18*aa* of the long end 18*a* of the shackle 18 therethrough. The sleeves 23 are rotatable within the rotatable gears 20*a*-20*d* so that the passages 23*a* are aligned and permit passage of the protrusions 18*aa* when the alarm tag 10 is in the opened state for opening or setting of the alarm tag 10. Once the shackle 18 is inserted and the alarm tag 10 is locked, the passages 23*a* are no longer aligned with the protrusions 18*aa* and block the shackle 18 from being removed unless and until the correct combination is selected as explained below. The sleeves 23 are desirably made of metal.

The rotatable gears 20*a*-2*d* are surrounded and coupled to digit wheels 22*a*, 22*b*, 22*c*, and 22*d*, respectively. The interior of the digit wheels 22*a*-22*d* have indexed teeth 22*aa* to mesh with the drive surfaces 21 of the rotatable gears 20*a*-20*d* so that rotation of the digit wheels 22*a*-22*d* rotates the rotatable gears 20*a*-20*d*. As shown, four rotatable gears are utilized to provide a four-digit combination for enhanced security. It will be understood that fewer or more rotatable gears may be utilized depending upon the desired number of digits for the security combination.

Figure 1E:
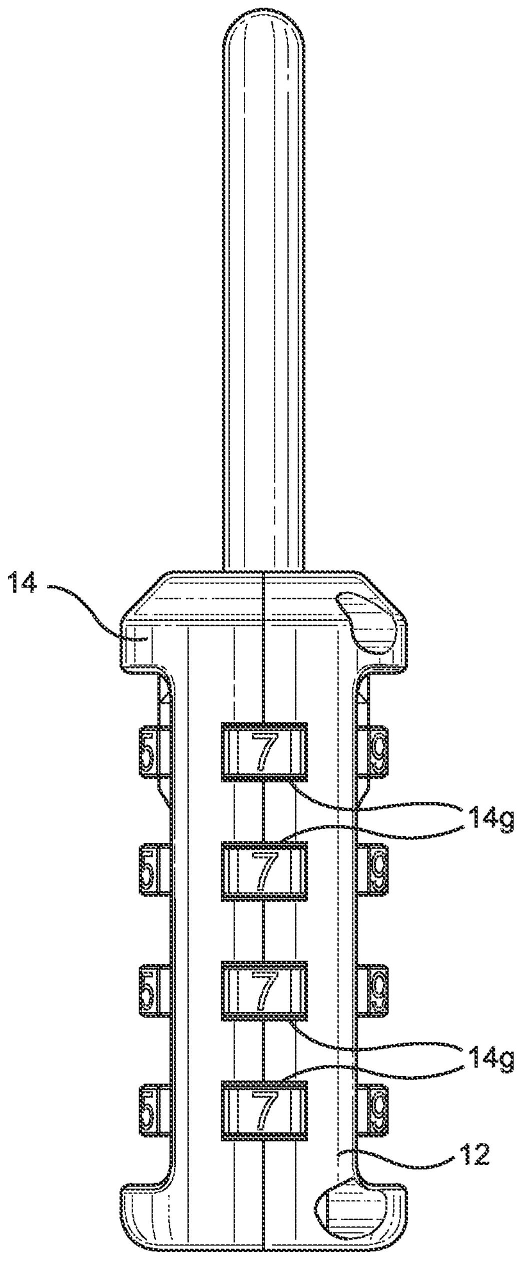
FIG. 1E is a side view thereof.

The digit wheels 22*a*-22*d* are with indexed surfaces 24 for selective touching by the finger of a user with each indexed surface having indica or indicium thereon, such as numbers 24*a*, such as the numbers 1-9, for providing a combination access feature as explained more fully below. There may be fewer or more possible combination numbers or indicium depending on the size of the wheels 22*a*-22*d*. In the assembled alarm lock 10, the numbers 24*a* that correspond to the numbers for a combination set to a pre-selected combination for the alarm tag 10 are those that are located at the slots 14*g*. FIG. 1E shows the pre-selected combination set to 7777. The slots 12*e* and 14*e* are provided to facilitate turning or rotation of the digit wheels 22*a*-22*d*. The digit wheels 22*a*-22*d* are desirably made of metal.

A coiled support spring 26 is located to contact the lowermost rotatable gear 20*a* and support the column of the rotatable gears 20*a*-20*d*. An indexing member 28 is provided to apply pressure to the digit wheels 22*a*-22*d* so that they do not just freely spin and rotate in an indexed manner. The indexing member 28 is located within the housings 12/14 and may be made of a spring steel material and includes fingers 28*a*, 28*b*, 28*c*, and 28*d* spaced and oriented to contact and apply pressure to the indexed surfaces 24 of the digit wheels 22*a*-22*d*, respectively, as they rotate past the fingers 28*a*-28*d* within the housing. A silicone pad 29 electrically insulates the indexing member 28 from the electronics of the combination alarm tag 10.

Electronics for the combination alarm tag 10 may include an electronic circuit provided by a printed circuit board 30 powered by a battery 31 mounted to the printed circuit board 30 by a battery holder 31*a*. Mounted on the printed circuit board 30 are an audio speaker 32, an illumination source 34, and a pair of switch assemblies 36 and 38.

Also shown is an optional resistor 30*a*. As described below, the resistor 30*a* is operative to interact with an EAS antenna and when exposed to the electrical signal of the EAS antenna, such as when passing by the EAS antenna, impart a resistance to the closed circuit of the triggered combination alarm tag 10 and trigger the alarm features of the alarm tag 10.

The audio speaker 32 is configured to provide an audible alarm sound when activated by the printed circuit board 30. An inductor 32*a* is included to boost the volume of the speaker 32. The illumination source 34 is configured to provide illumination, such as flashing light, when activated by the printed circuit board 30. The illumination source 34 can be a variety of low voltage illumination devices, such as LEDs or a light guide as depicted. The audible alarm sound and the flashing light are referred to herein collectively as alarm features of the combination alarm tag 10 and depicted in the drawings by reference numeral 10*a*.

The switch assembly 36 includes a micro switch or miniature snap-action switch 36*a*, an actuating plunger 36*b*, and a spring 36*c* that attaches to a hook 36*bb* on the plunger 36*b*. The micro switch 36*a* is closed by activation of the plunger 36*b* to allow electrical communication or opened to disable electrical communication. The spring 36*c* maintains the plunger 36*b* in a position so that the micro switch 36*a* is open or disabled so that electricity does not flow, and the pressure of the spring 36*c* is overcome to actuate the plunger 36*b*. The switch assembly 38 is identical to the switch assembly 36 and includes a micro switch or miniature snap-action switch 38*a*, an actuating plunger 38*b*, and a spring 38*c* that attaches to a hook 38*bb* on the plunger 38*b*. When the micro switches 36*a* and 28*a* are closed, the alarm features 10*a* (speaker 32 and illumination source 34) are activated.

A coiled portion of a signal spring 40 is located to contact the end of the short-end 18*b* of the shackle 18. An elongate portion of the coiled signal spring 40 connects to the printed circuit board 30. A coiled portion of a signal spring 41 is located to contact the lowermost end of the long-end 18*a* of the shackle 18. An elongate portion of the signal spring 41 connects to the printed circuit board 30.

As will be appreciated, the shackle 18 is connected to the printed circuit board 30 by the signal springs 40 and 41 to create an electrical continuity. When the combination alarm tag 10 is armed, as described below, disconnection of this continuity will trigger the alarm features of the alarm tag 10. For example, if the shackle 18 were cut, this would trigger the alarm features of the alarm tag 10.

The printed circuit board 30 connects on one side with conductive springs 42 mounted on lead pillars 42*a* which connect to a conductive foil 44 that abuts the rear housing 14. The printed circuit board 30 connects on the opposite side with conductive springs 46 mounted on lead pillars 46*a* which connect to a conductive foil 48 that abuts the front housing 12. The conductive foils 44 and 46 are made of a thin electrically conductive film that is easily torn. In the event front housing 12 or rear housing 14 is broken when the alarm tag 10 is in the locked and armed condition, the conductive foil 44 or 46 or both will tear and open the circuit to cause the alarm features 10*a* of the alarm tag 10 to be activated.

Figure 3:
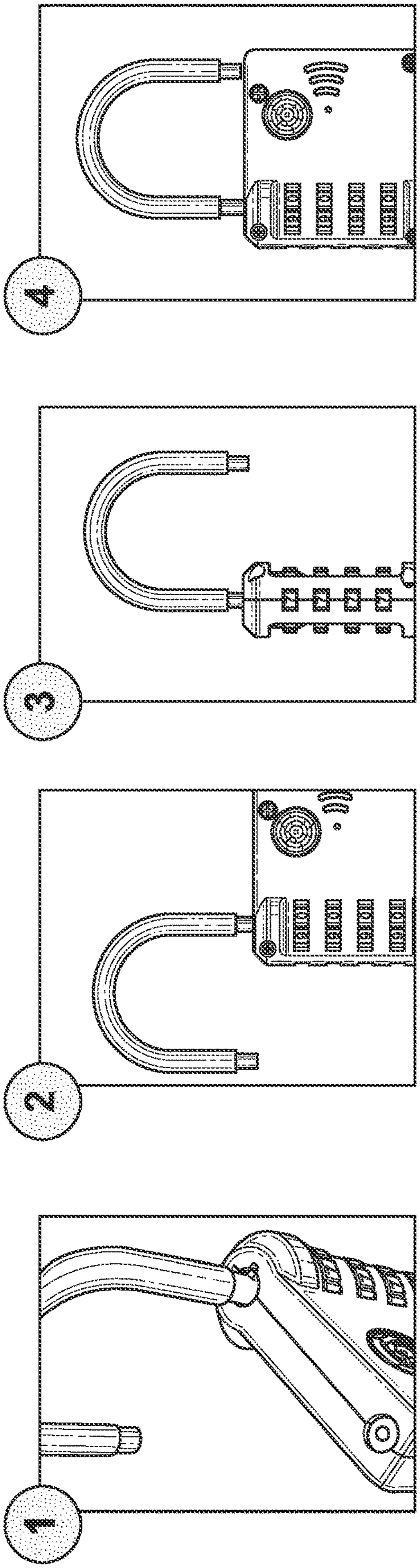
FIG. 3 depicts steps in setting the alarm tag for use.

With reference to FIG. 3, there are shown steps in setting the combination of numbers of the digit wheels 22*a*-2*d* for opening of the alarm tag 10 without setting off the alarm features. As shown, in a first step to set or change the combination, with the shackle 18 free such that the protrusions 18*aa* are aligned with the interior passages 23*a* of the rotatable gears 20*a*-20*d*, the shackle 18 is placed in a combination change position with the shackle 18 rotated about 90 degrees forward so that the rotatable gears 20*a*-20*d* are rotated and the protrusions 18*aa* are aligned with the slot of the rear housing 14. The long end 18*a* is then pushed downward and rotated a further approximately 90 degrees so that the short end 18*b* is to the side. The digit wheels 22*a*-22*d* are then rotated to select a desired combination. The shackle 18 is then rotated back to the starting orientation with the shackle 18 aligned with the width of the alarm tag 10 such that the short end 18*b* of the shackle 18 is overlying the hole. The alarm tag 10 is thereafter ready for application. To disable the alarm tag 10, the user will rotate the digit wheels 22*a*-22*d* to the selected combination which results in the passages 23*a* of the rotatable gears 20*a*-20*d* being aligned, with the protrusions 18*aa* of the shackle 18 aligned therewith, enabling the shackle 18 to eject upward.

Returning to FIGS. 2C-2D, FIG. 2C represents a condition when the gears 20*a*-20*d* are not aligned to the preselected combination, and FIG. 2D represents the condition when the gears 20*a*-20*d* are aligned to the pre-selected combination. As will be noted, when the gears 20*a*-20*d* are in the correct pre-selected combination, the switch extensions 21*a* are all aligned with and engage the switch actuators 36*b* and 38*b* to turn off the electronic circuit. When the gears 20*a*-20*d* are rotated away from the pre-selected combination so that the gears 20-20*d* are not engaged by the switch extensions 21*a*, such as shown in FIG. 2C, the springs 36*c*/36*d* connected to the hooks 36*bb*/38*bb* urge the actuators 36*b*/38*b* back towards the gears 20*a*-20*d* and turn on the electronic circuit.

The reference extensions 21*b* are utilized for the setting of a pre-selected combination. As will be noted, when the switch extensions 21*a* are aligned, the reference extensions 21*b* are also aligned. As noted above, when a user is setting the pre-selected combination code, the shackle 18 is pushed down. During this, the reference extensions 21*b* serve to locate each of the gears 20*a*-20*d* at their original position, and the protrusions 18*aa* on the shackle 18 will disengage from the gears 20*a*-20*d*, permitting the pre-selected combination to be changed to a different combination.

Figure 4:
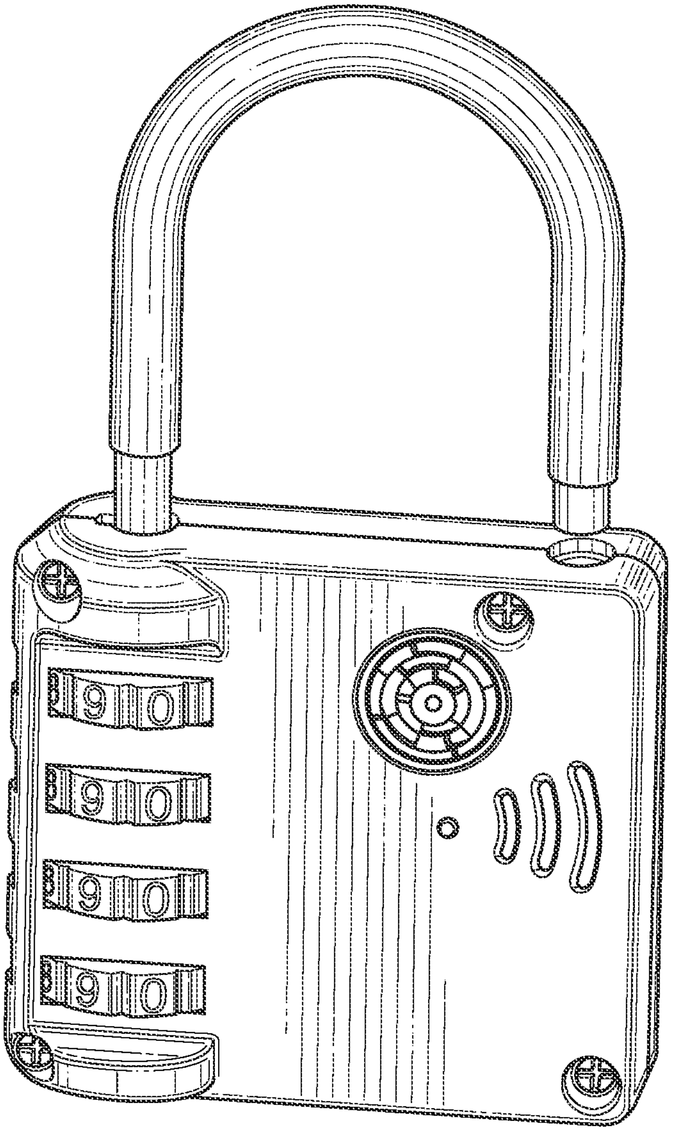
FIG. 4 depicts application of the alarm tag.

FIG. 4 depicts application of the alarm tag 10 for use. The alarm tag 10 is positioned adjacent to the object to which it is to be attached in an upright and open position with the shackle 18 arranged around a portion of the object. The shackle 18 is then aligned with the hole and the shackle 18 is pushed gently by the user into the hole. While the shackle 18 is held down in the hole, the user rotates the digit wheels 22*a*-22*d* until an audible beep or other indicative sound or indicator of the alarm tag 10 generated by the electronic circuit is triggered to indicate that the alarm tag 10 is engaged and functioning properly.

To remove the alarm tag 10 from the object, the digit wheels 22*a*-22*d* are turned until the desired combination is displayed on the end of the alarm tag 10 through the slots 14*g*. When the desired combination is displayed the shackle 18 will rise such that the short end 18*b* is free.

Figure 5A:
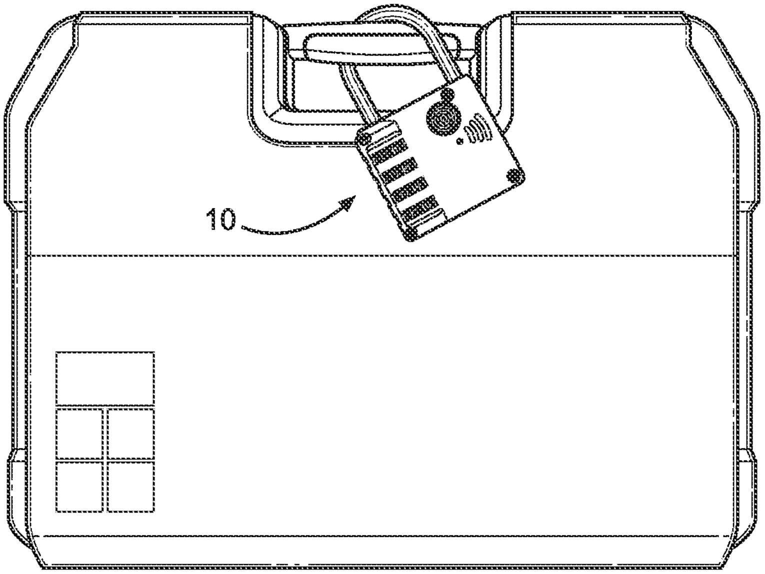
FIGS. 5A-5E depict use and operation of the alarm tag when applied to an article in a store setting.
Figure 5B:
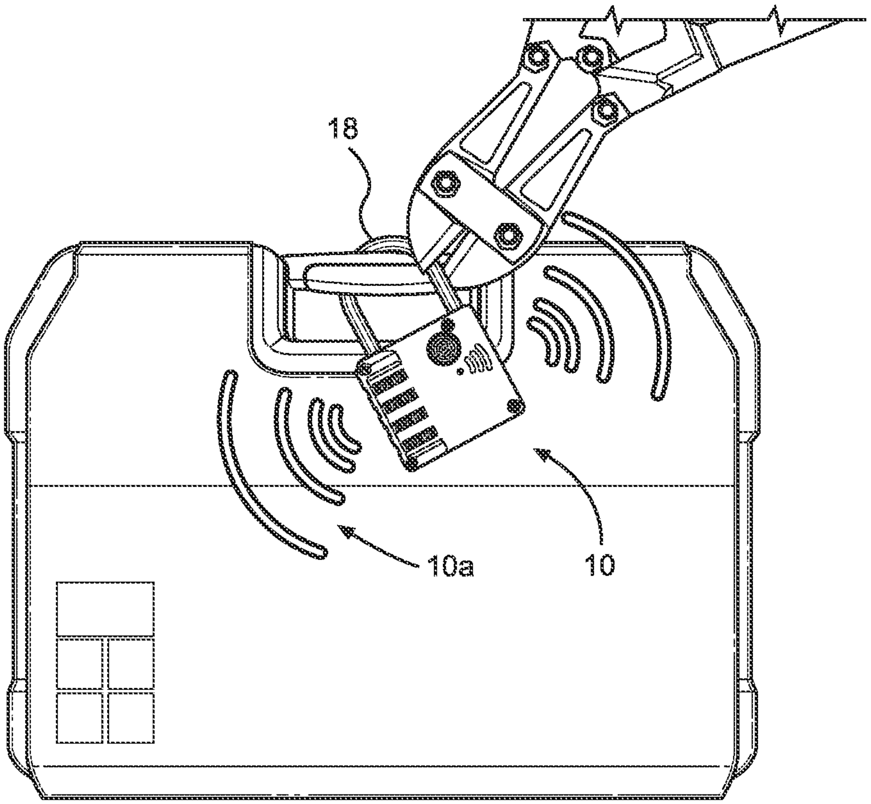
Figure 5C:
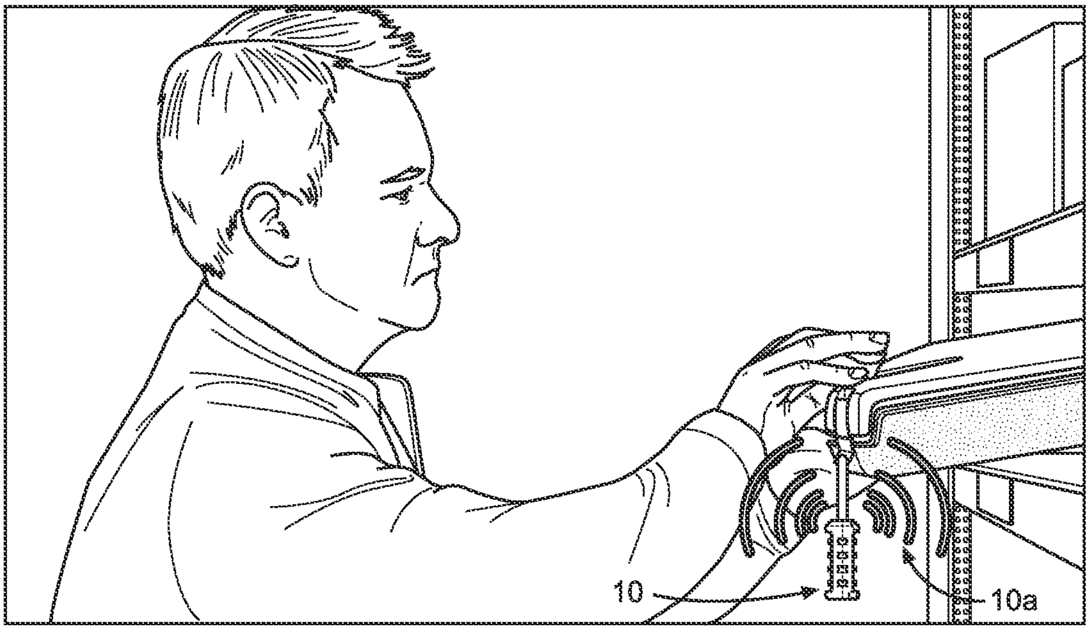

Turning to FIGS. 5A-5E, use and operation of the alarm tag 10 is depicted when the alarm tag 10 is applied to an article, such as a power tool package P in a store setting, such as shown in FIG. 5A. As depicted in FIG. 5B, if the shackle 18 is cut, as by use of bolt cutters, the alarm features of the alarm tag 10 are triggered. As depicted in FIG. 5C, if an attempt is made to open the package P the alarm features are triggered.

Figure 5D:
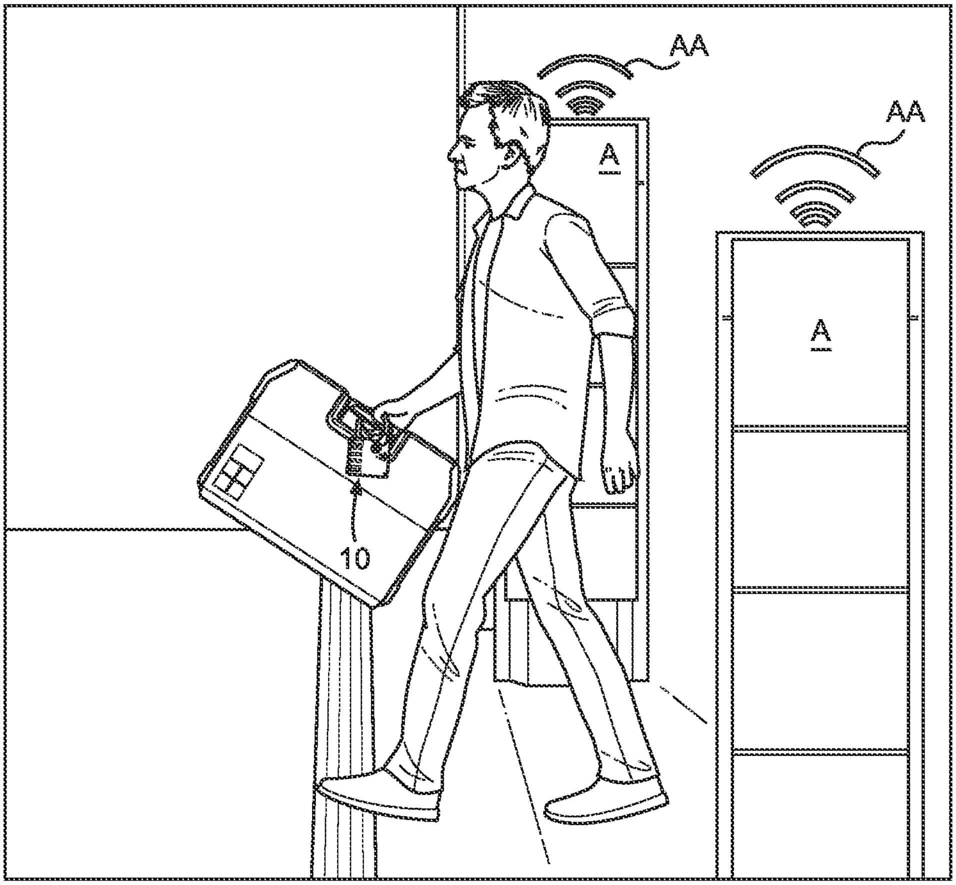

As shown in FIG. 5D, if the package P with the alarm tag 10 becomes within a predetermined distance of an EAS antenna A having alarm features depicted as AA, such as the package being carried past the EAS antenna A, the alarm features of the EAS antennae AA will be triggered. Alarm features AA can include sound or illumination or both or other alarm features conventional to EAS antennas.

As described herein, the EAS antenna A is a conventional EAS antenna operable to transmit electrical signals at regular intervals. The printed circuit board 30 is also configured to cooperate in the manner of a conventional EAS tag and respond to the EAS antenna when the alarm tag 10 is within a predetermined distance of the EAS antenna, usually from about 5 to about 10 feet, and trigger the alarm features AA of the EAS antenna. This may be done by having a signal responder provided as a layer incorporated into the printed circuit board 30. A lower cost way to do this is to add onto the printed circuit board 30 a conventional induction coil of the type used in conventional EAS tags. When the alarm tag 10 passes within proximity of the EAS antenna A, the EAS antenna A will detect the signal from the printed circuit board 30 and/or induction coil and trigger alarm features of the EAS antenna A.

The alarm tag 10 the printed circuit board 30 may also be configured in a similar manner be configured to provide a Radio Frequency Identification (RFID) tag function and interact with a conventional RFID reader in the same manner as with an EAS antenna.

Figure 2A:
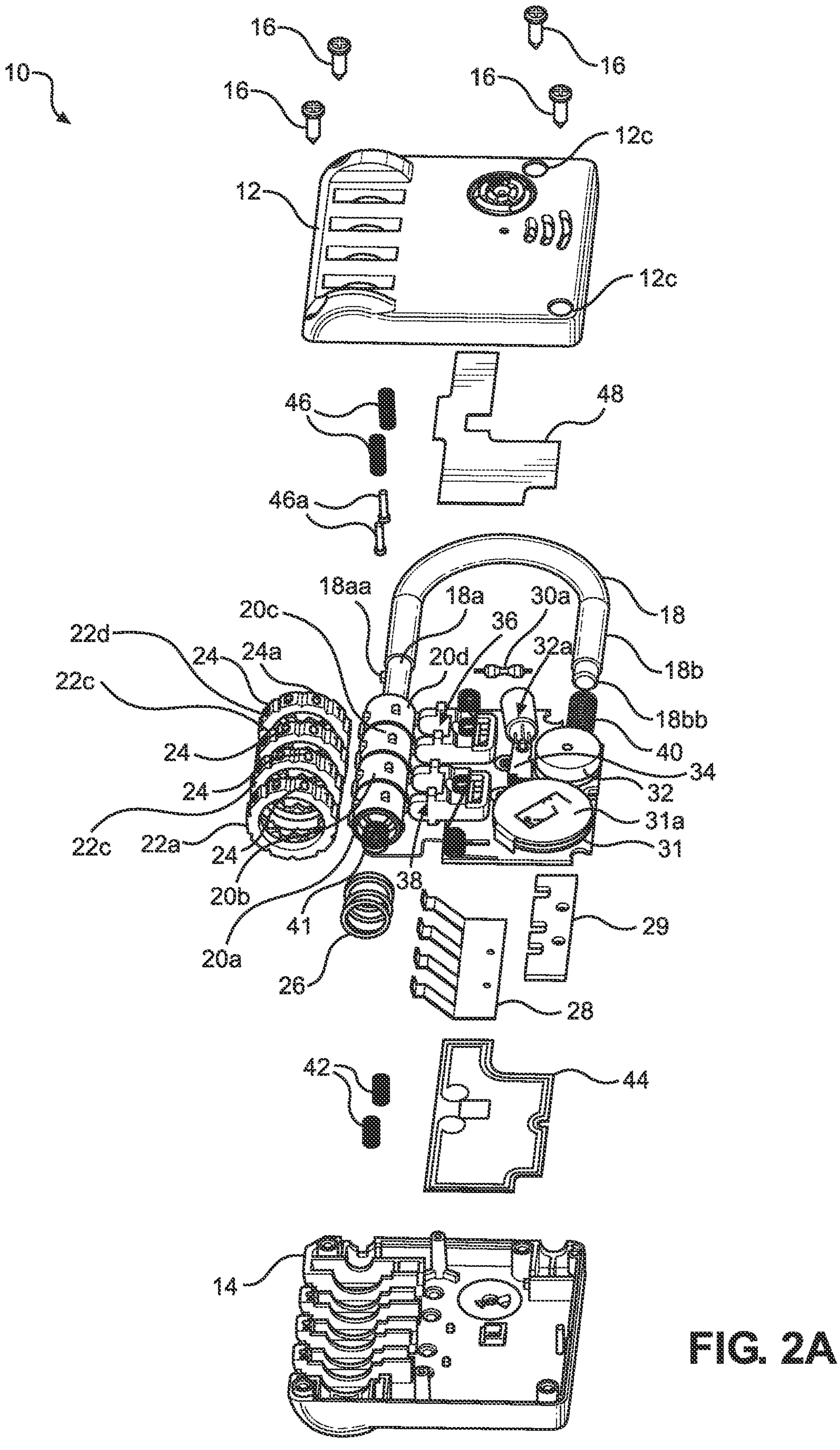
FIGS. 2A and 2B are exploded views of the alarm tag.
Figure 2B:
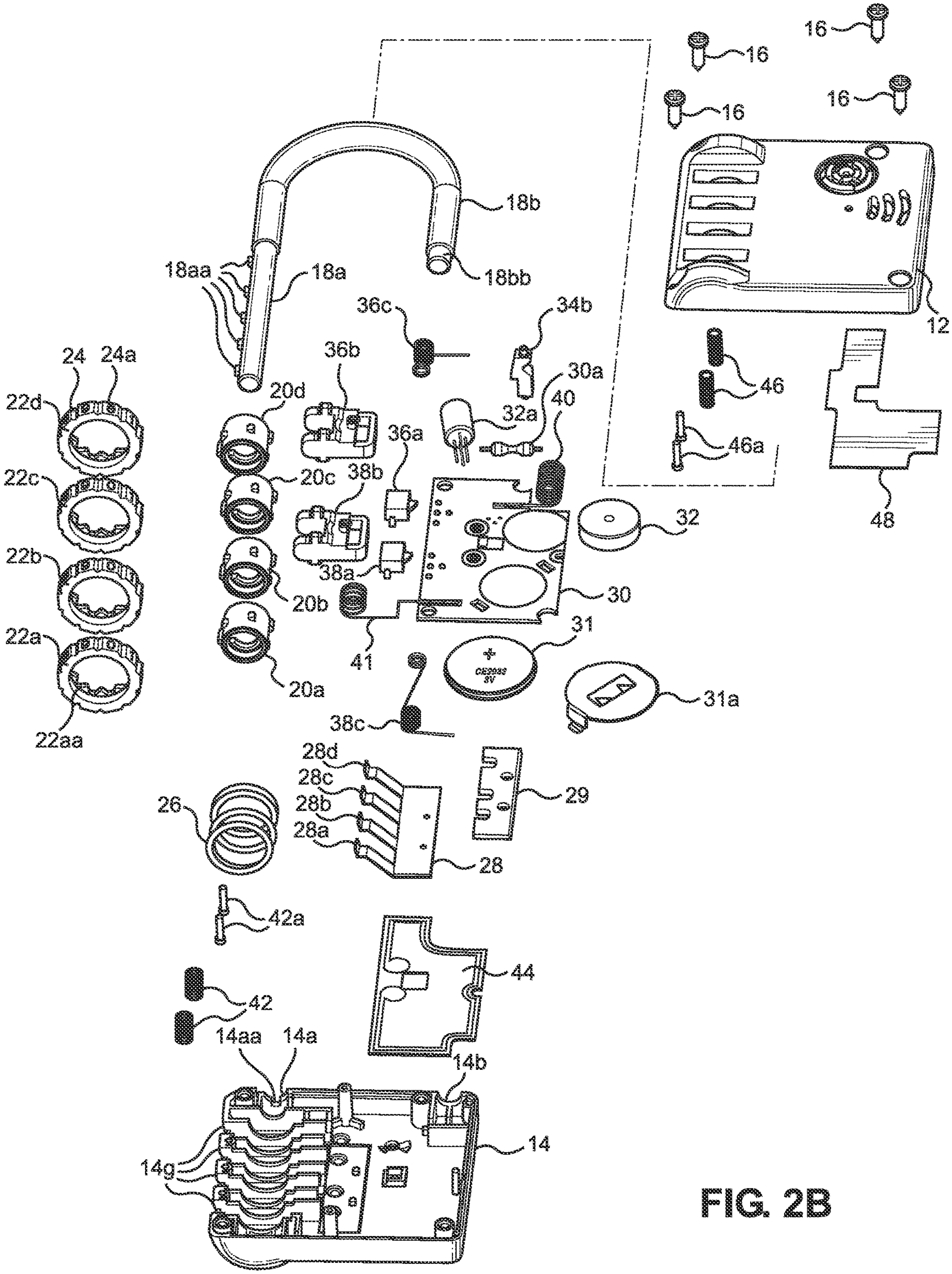
Figure 2D:
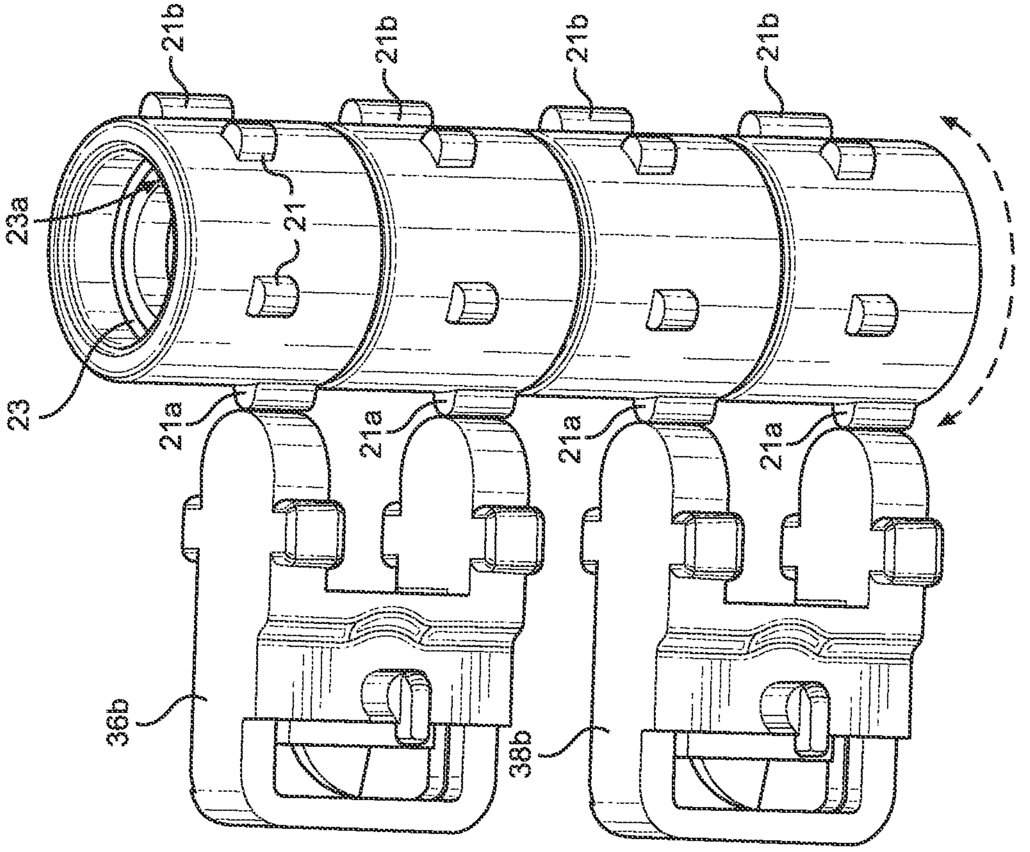
FIGS. 2C and 2D show interaction of gears with switch actuators of the alarm tag.
Figure 2C:
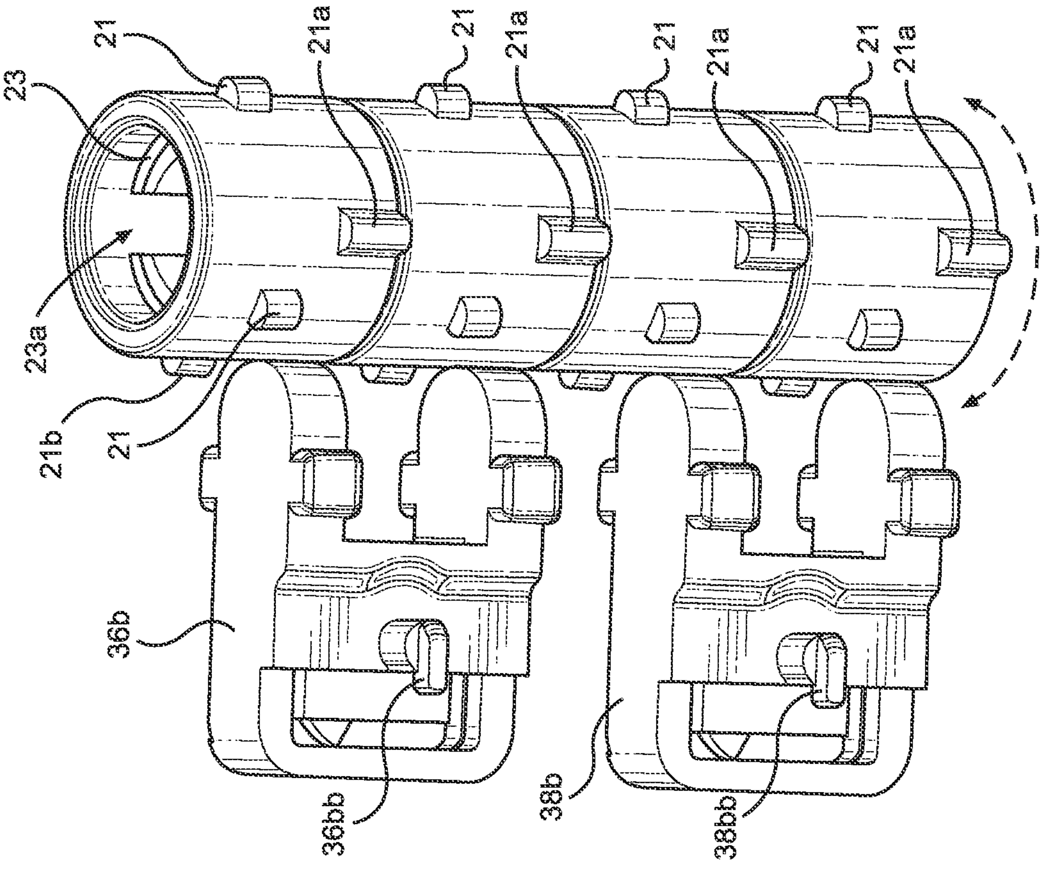
Figure 5E:
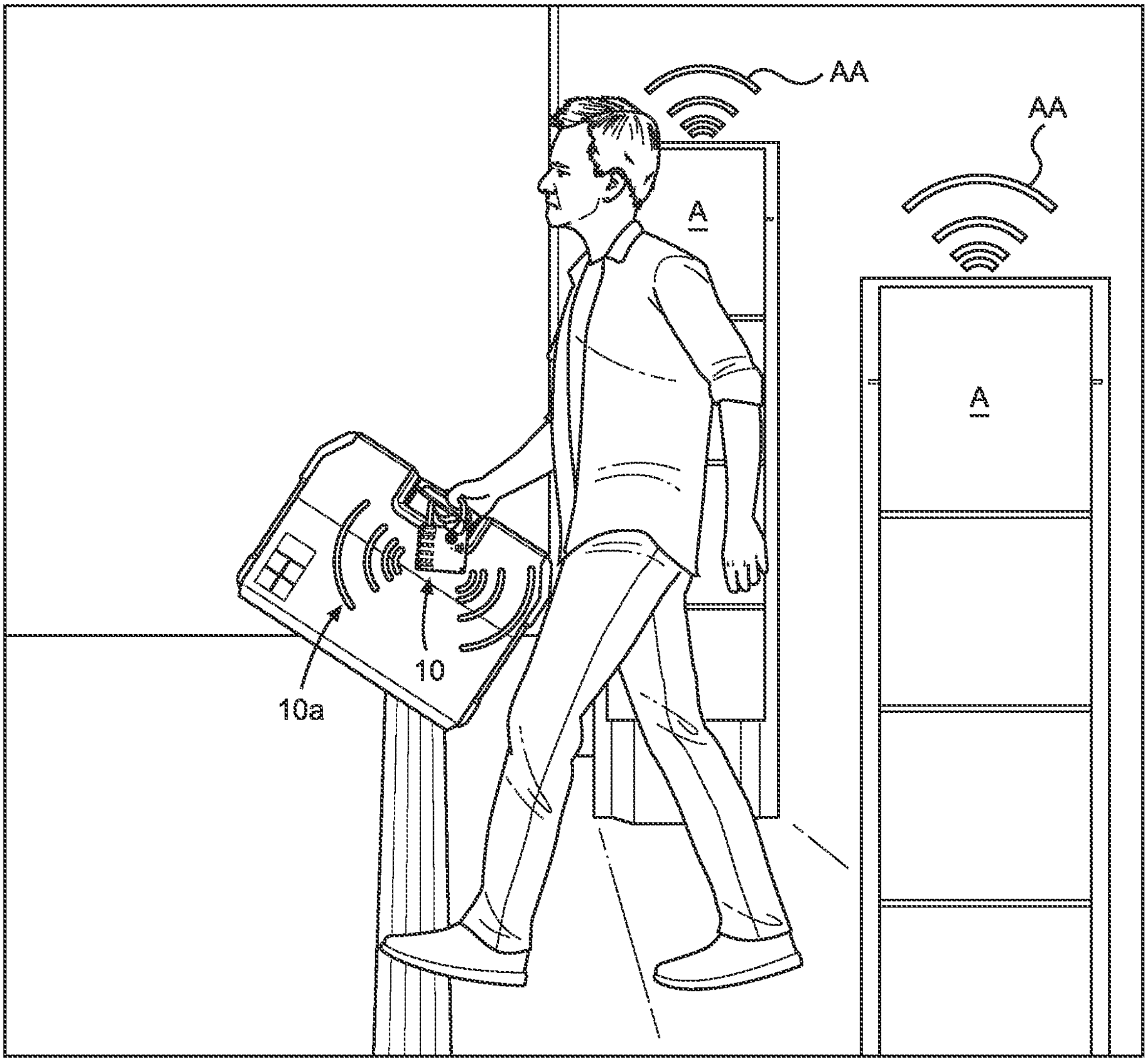

Turning to FIG. 5E, this figure is the same as FIG. 5D, except that the printed circuit board 30 includes the resistor 30*a* (shown in FIGS. 2A and 2B). The resistor 30*a* is operative to interact with the EAS antenna and when exposed to the electrical signal of the EAS antenna, such as when passing by the EAS antenna, impart a resistance to the closed circuit of the triggered combination alarm tag 10 and trigger the alarm features 10*a* of the alarm tag 10.

Figure 6B:
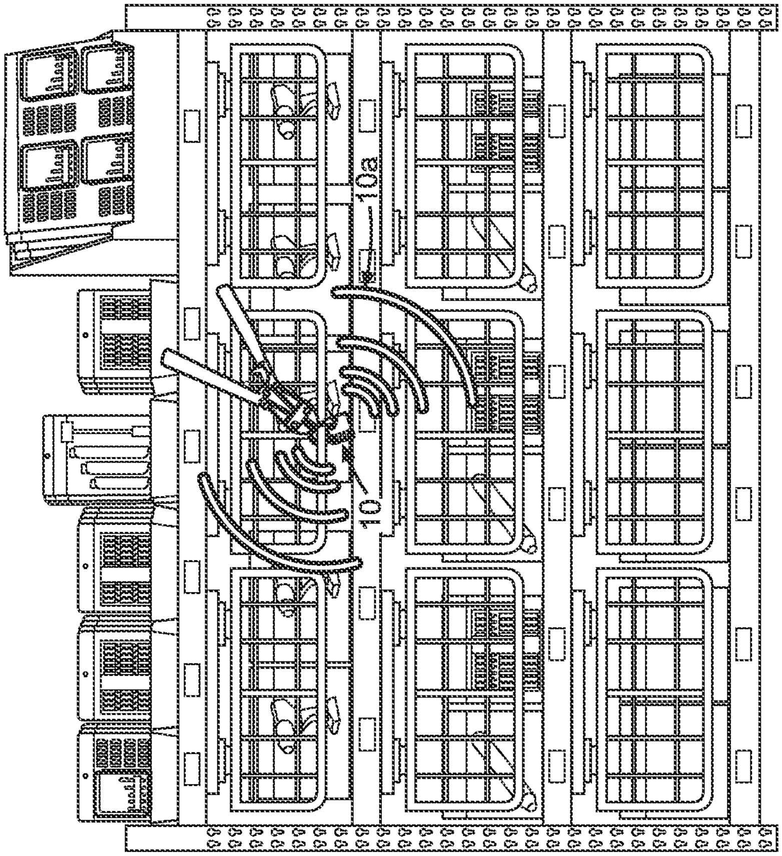
FIGS. 6A-6E depict use and operation of the alarm tag when applied to a display case of articles in a store setting.
Figure 6A:
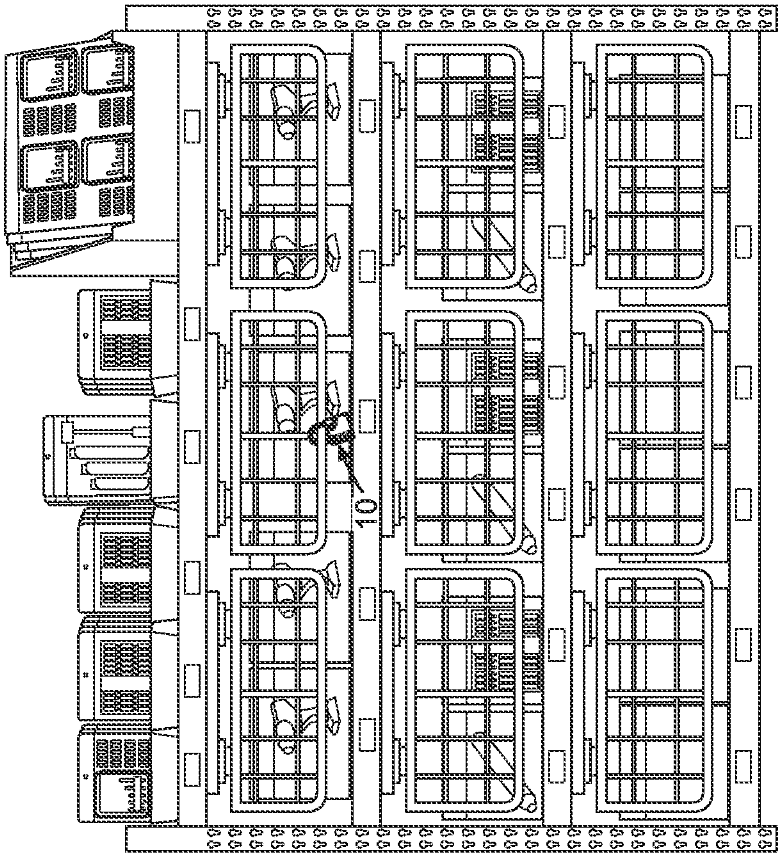
Figure 6C:
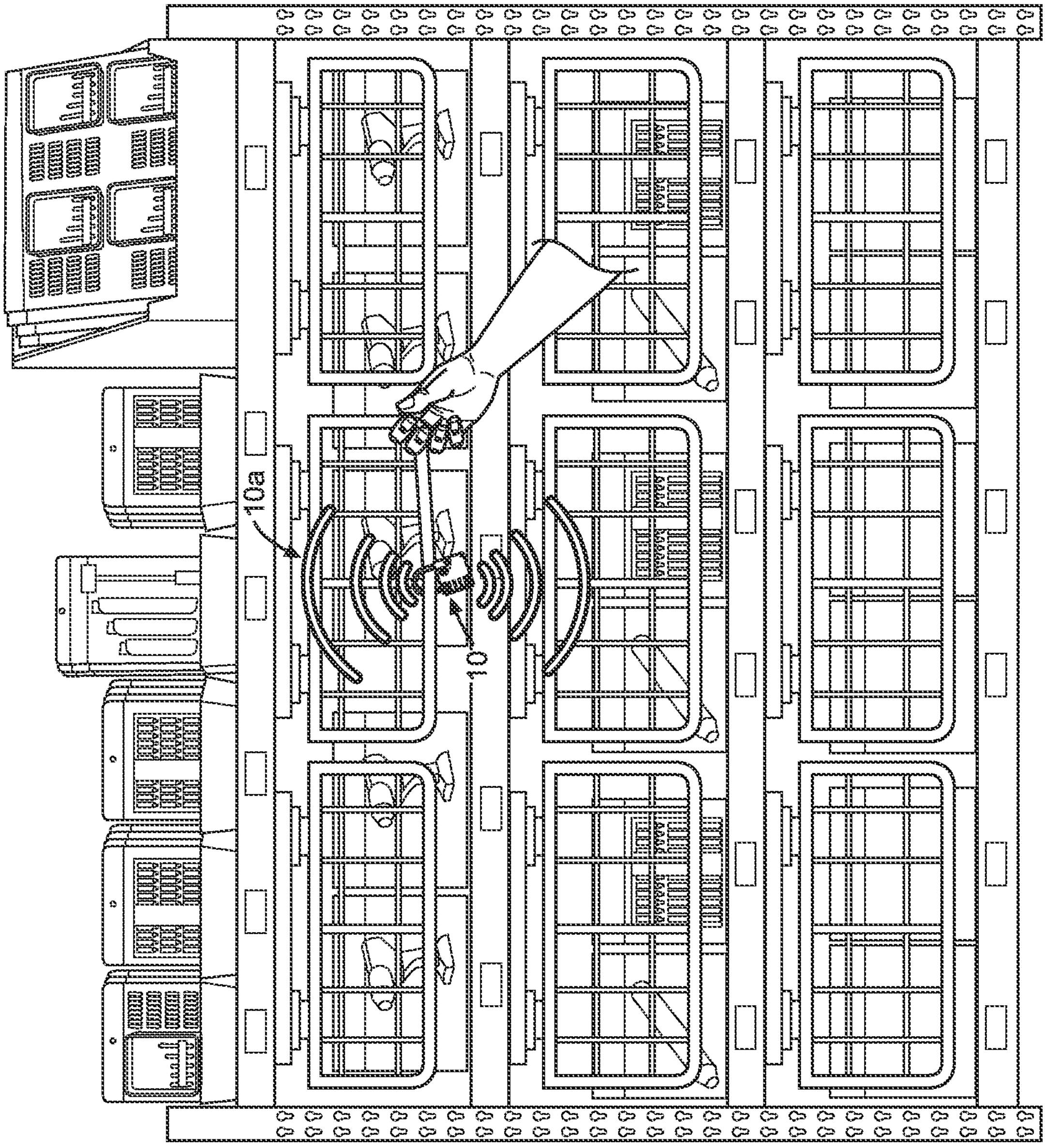
Figure 6D:
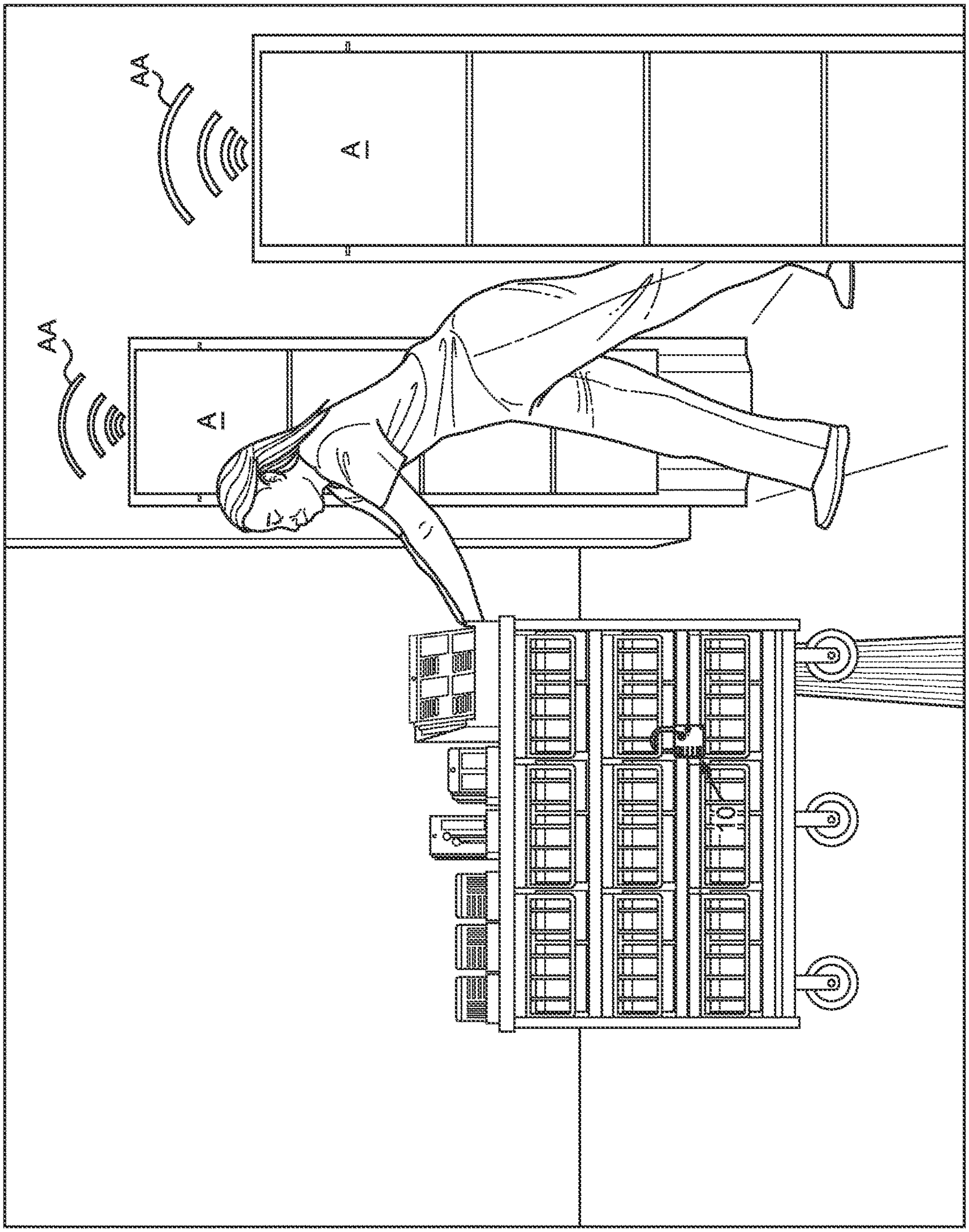
Figure 6E:
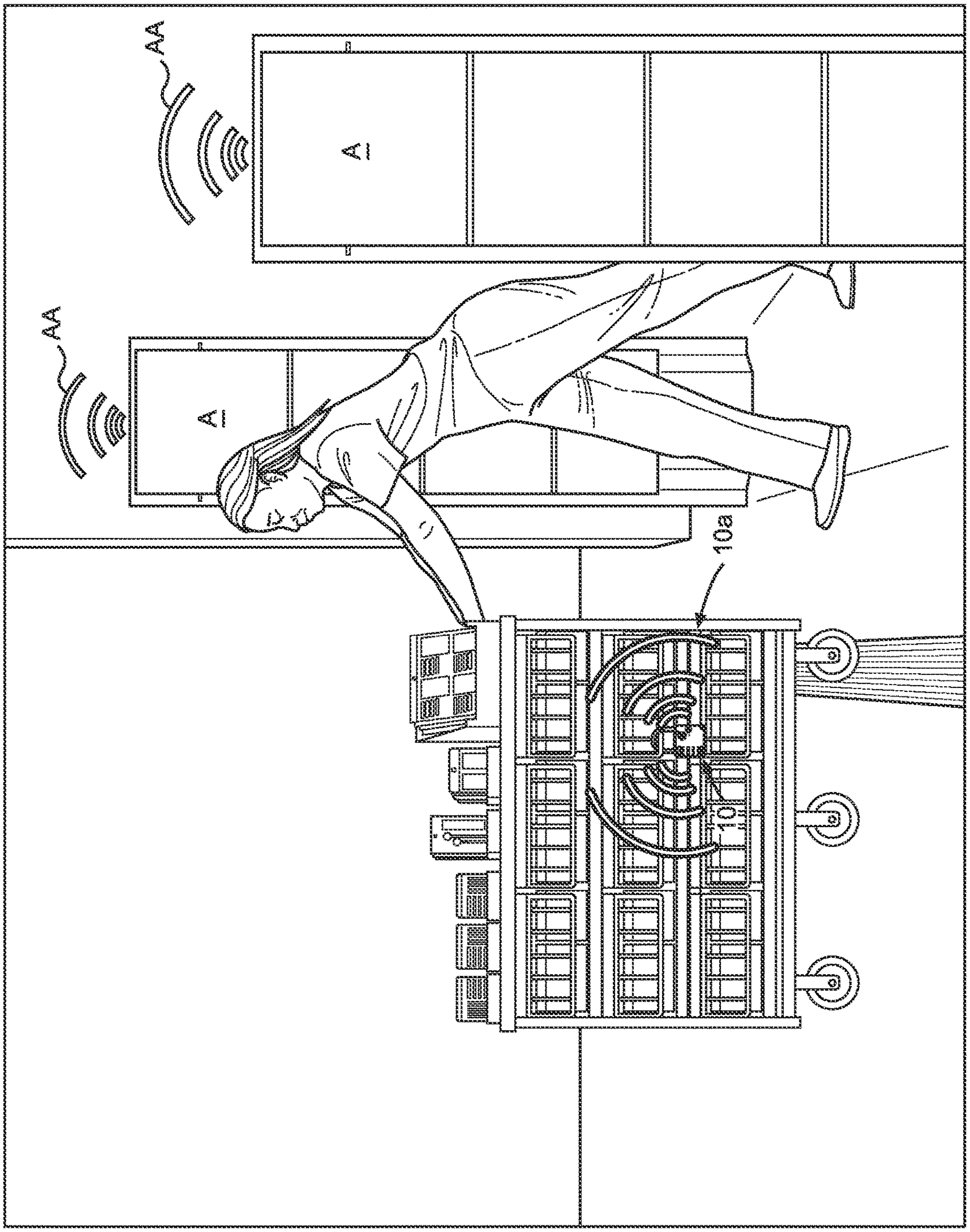

FIGS. 6A-6E depict use and operation of the alarm tag when applied to a display case C of articles, such as the packages P, in a store setting, such as shown in FIG. 6A. As depicted in FIG. 6B, if the shackle 18 is cut, as by use of bolt cutters, the alarm features of the alarm tag 10 are triggered. As depicted in FIG. 6C, if an attempt is made to open the case C the alarm features are triggered. As shown in FIG. 6D, if the case C with the alarm tag 10 is moved past the EAS antennae A, the alarm features AA of the EAS antennae A will be triggered. FIG. 6E is the same as in FIG. 6D, except in this case the alarm tag 10 is configured to include the resistor 30*a* as described so that when the alarm tag 10 is exposed to the EAS antennae A, the alarm features 10*a* of the alarm tag 10 are triggered as well as the alarm features AA of the EAS antennae A.

Figure 7A:
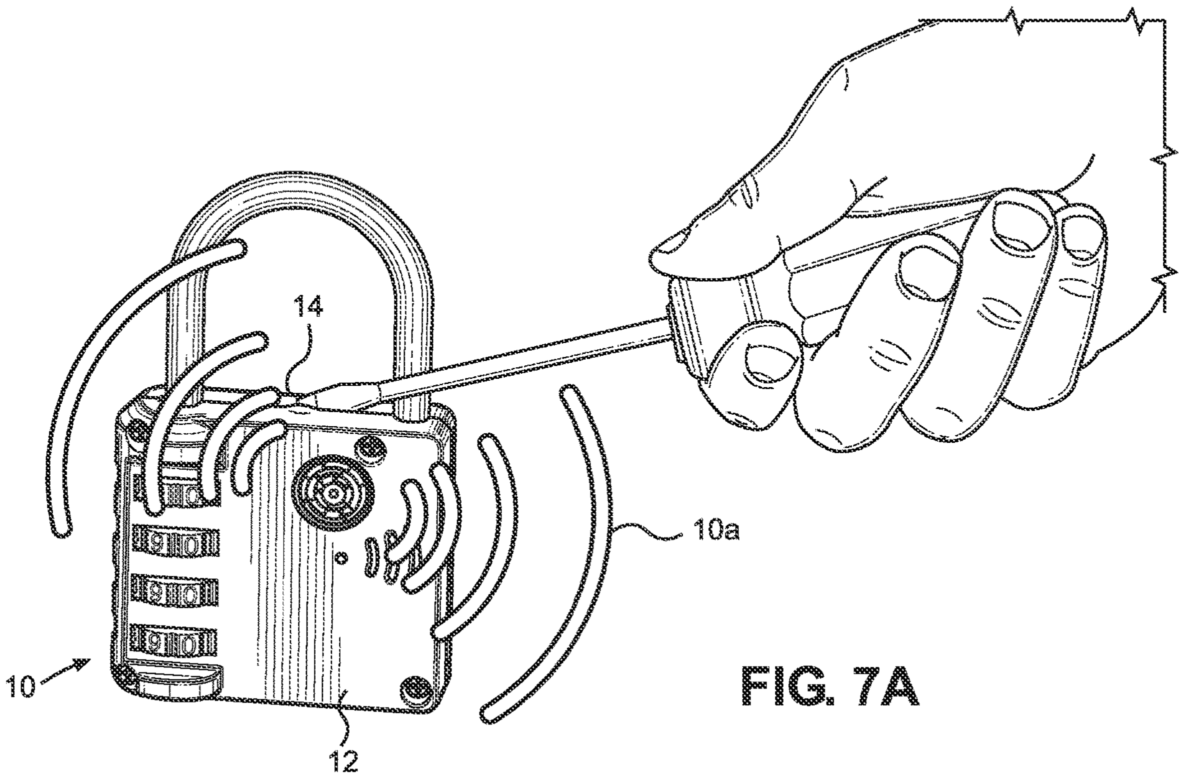
Figure 7B:
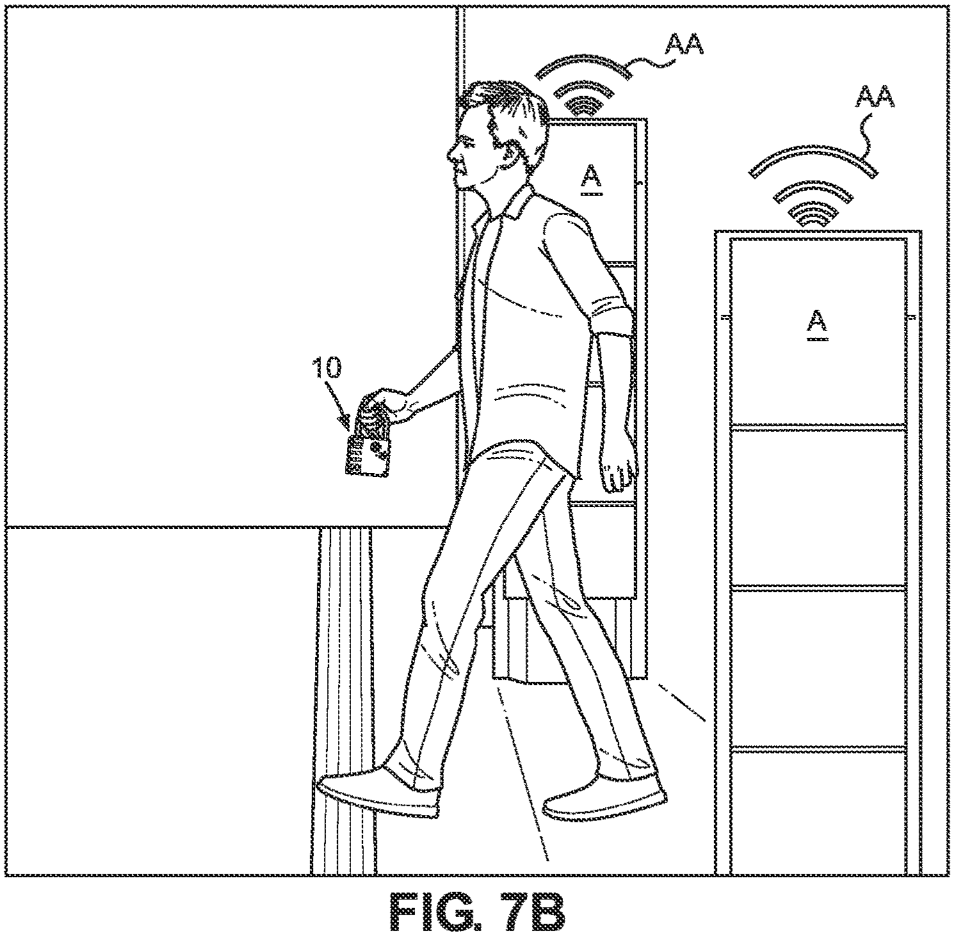
Figure 7C:
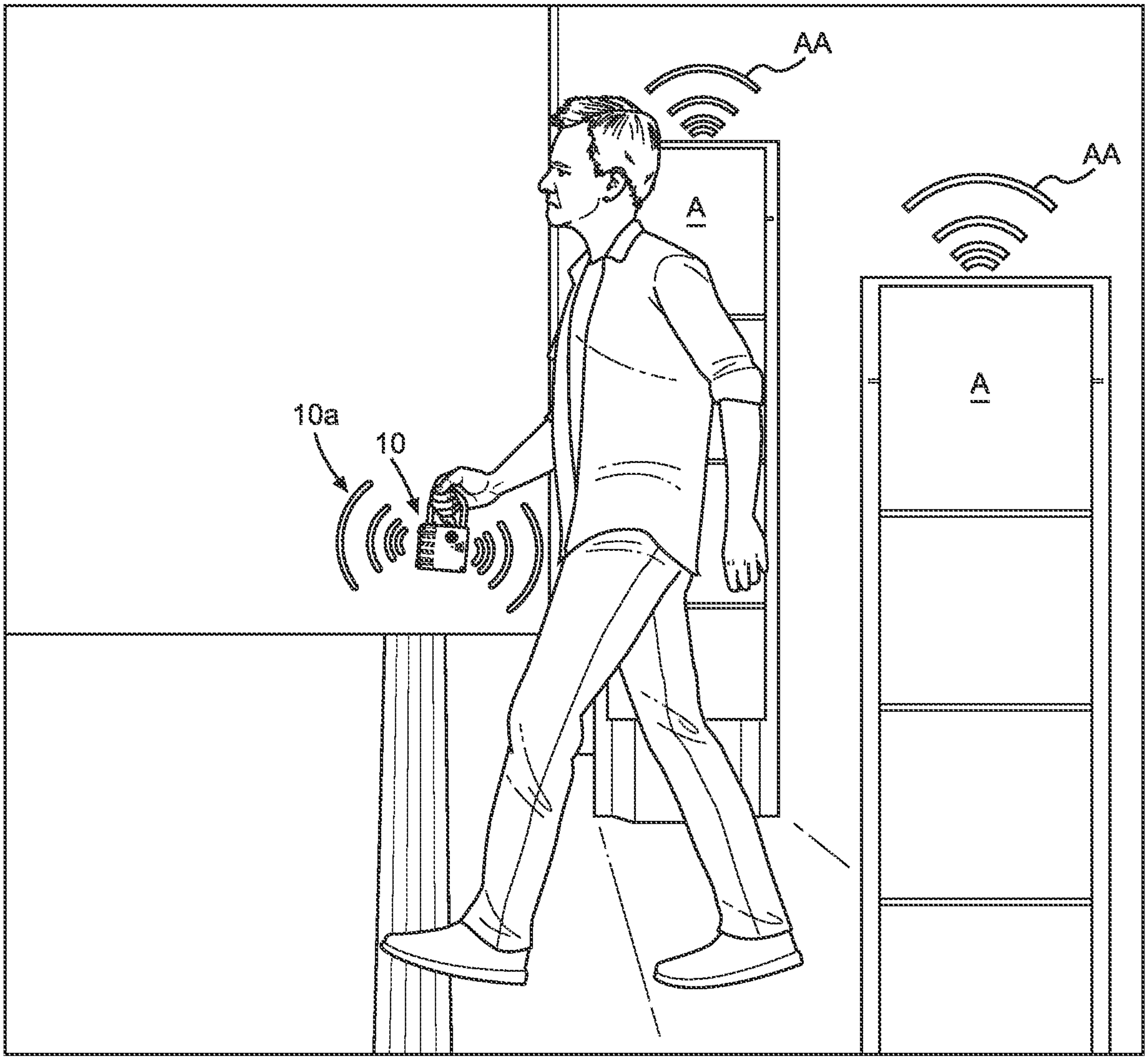

FIGS. 7A-7C depict use and operation of the alarm tag in a store setting when the alarm tag is not applied to an article or case or the like. As shown in FIG. 7, if an attempt is made to disassemble or open the alarm tag 10, such as to disable it or to investigate the structure and operation of the alarm tag 10 to try and figure out how to thwart the alarm tag 10, the alarm features of the alarm tag 10 will be triggered. In FIG. 7B, if the alarm tag 10 is moved past the EAS antennae A, the alarm features of the EAS antennae AA will be triggered. FIG. 7C is the same as FIG. 7B, except that the printed circuit board 30 includes the resistor 30*a*. As such, the alarm features 10*a* of the alarm tag 10 are also triggered when the combination alarm tag 10 passes by the EAS antenna A.

Accordingly, it will be appreciated that present disclosure provides an improved alarm tag having combination access to not require a separate key or detachment device to remove the alarm tag 10 from an article. The alarm tag of the disclosure also has improved aesthetics and is constructed to be suitable for use as an EAS alarm tag to trigger the alarm features of an EAS antenna. The alarm tag 10 also has independent on-board alarm features that are triggered in the event of tampering with articles to which the alarm tag 10 is applied as well as tampering with the alarm tag 10 itself, or passing proximate and EAS antenna.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. An alarm system, comprising:

an electronic antenna having an electronic alarm; and an alarm tag combination lock that is securable in a locked condition to an article to be protected and removable from the article to an unlocked condition without use of a separate key or detachment device, the alarm tag comprising:

a housing containing an electronic circuit having a lock alarm that is activated only when the alarm tag combination lock is in the locked condition and the electronic circuit also being operable to activate the electronic alarm of the electronic antenna when located within a predetermined distance proximate the electronic antenna, a shackle configured to lock into the housing to provide the locked condition, and a plurality of rotatable gears and a plurality of digit wheels corresponding in number to the plurality of rotatable gears, each of the digit wheels surrounding and coupled to one of the rotatable gears and bearing combination indicia or indicium so that rotation of the digit wheels causes rotation of the rotatable gears and the digit wheels are positionable to orient the combination indicia or indicium of the digit wheels to a desired combination for providing the unlocked condition for the alarm tag combination lock with the alarm tag combination lock being in the locked condition when the digit wheels are otherwise oriented, the digit wheels each include a switch extension engageable with a switch actuator associated with the electronic circuit for turning off the electronic circuit when the alarm tag combination lock is in the unlocked condition;

the alarm tag combination lock being operable by rotation of the digit wheels to secure the shackle in the locked condition to the housing and to release the shackle from the locked condition to the housing to provide the unlocked condition with the electronic circuit turned off;

wherein the lock alarm of the electronic circuit is activated if the housing is broken or the shackle is cut when the alarm tag combination lock is in the locked condition, and the lock alarm of the electronic circuit is also activated if the alarm tag combination lock comes within the predetermined distance proximate the electronic antenna when the alarm tag combination lock is in the locked condition, and wherein the electronic alarm of the electronic antenna is activated if the alarm tag combination lock comes within the predetermined distance proximate the electronic antenna.

2. The alarm system of claim 1, wherein the electronic circuit is also operable to activate the lock alarm if the alarm tag combination lock comes within the predetermined distance proximate the electronic antenna.

3. The alarm system of claim 1, wherein the lock alarm comprises sound and illumination.

4. The alarm system of claim 1, wherein the electronic antenna comprises an EAS antenna or an RFID antenna.

5. An alarm system, comprising:

an electronic antenna having an electronic alarm; and an alarm tag combination lock that is securable in a locked condition to an article to be protected and removable from the article to an unlocked condition, the alarm tag comprising:

a housing containing an electronic circuit including a circuit board having a lock alarm that is activated only when the alarm tag combination lock is in the locked condition and the electronic circuit also being operable to activate the electronic alarm of the electronic antenna when located within a predetermined distance proximate the electronic antenna, a shackle configured to lock into the housing to provide the locked condition, a signal spring located to electrically connect the shackle to the circuit board, and a plurality of rotatable gears and a plurality of digit wheels corresponding in number to the plurality of rotatable gears, each of the digit wheels surrounding and coupled to one of the rotatable gears and bearing combination indicia or indicium so that rotation of the digit wheels causes rotation of the rotatable gears and the digit wheels are positionable to orient the combination indicia or indicium of the digit wheels to a desired combination for providing the unlocked condition for the alarm tag combination lock with the alarm tag combination lock being in the locked condition when the digit wheels are otherwise oriented, the digit wheels each including a switch extension engageable with a switch actuator associated with the electronic circuit for turning off the electronic circuit when the alarm tag combination lock is in the unlocked condition;

the alarm tag combination lock being operable by rotation of the digit wheels to secure the shackle in the locked condition to the housing and to release the shackle from the locked condition to the housing to provide the unlocked condition with the electronic circuit turned off;

wherein the lock alarm of the electronic circuit is activated if the housing is broken or the shackle is cut when the alarm tag combination lock is in the locked condition, and the lock alarm of the electronic circuit is also activated if the alarm tag combination lock comes within the predetermined distance proximate the electronic antenna when the alarm tag combination lock is in the locked condition, and wherein the electronic alarm of the electronic antenna is activated if the alarm tag combination lock comes within the predetermined distance proximate the electronic antenna.

6. The alarm system of claim 5, wherein the digit wheels each include raised drive surfaces around exterior circumferences thereof, with the switch extension of each digit wheel below the plane of the drive surfaces of the digit wheel.

7. The alarm system of claim 6 wherein the digit wheels each include a reference extension above the plane of the drive surfaces of the digit wheel.

* * * * *